George D. Baldwin
Joseph Spiteri
Harry W. Grosser
Harold J. Collette
INVENTORS

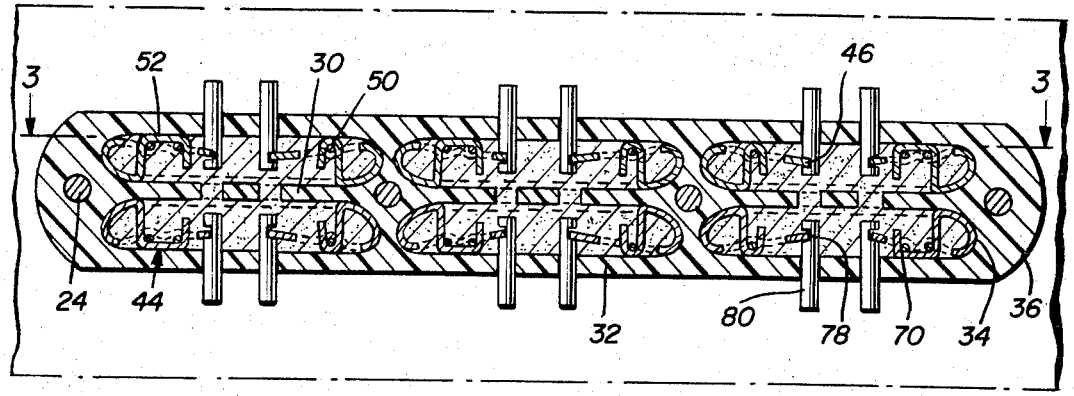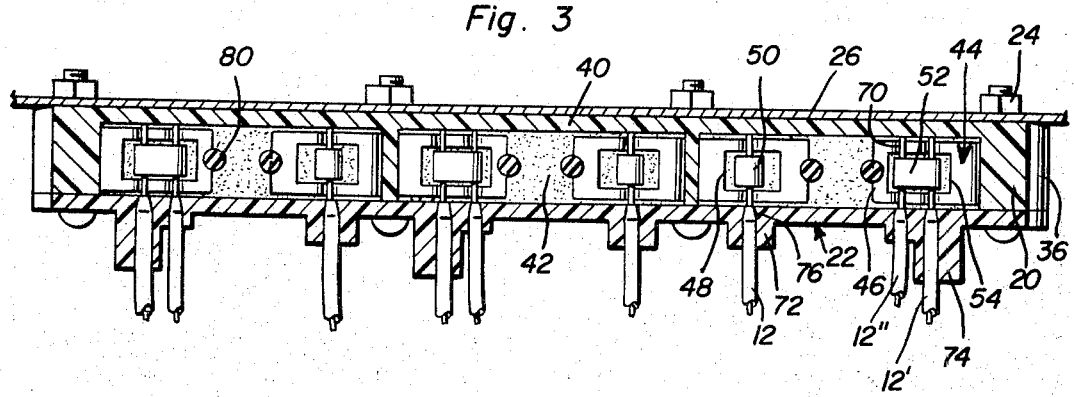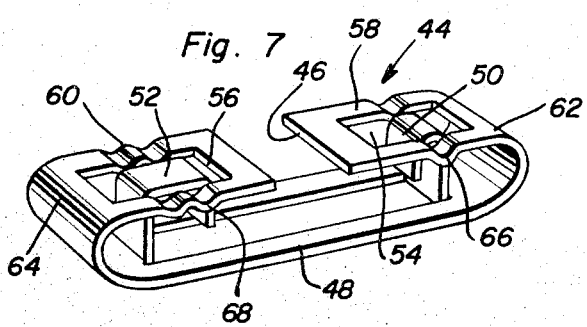

3,351,885
PROTECTIVE JUNCTURE BOX AND
RELEASABLE CONNECTOR
George D. Baldwin, Jamestown, N.Y., Joseph Spiteri, Erie, Pa., and Harry W. Grosser and Harold J. Collette, Jamestown, N.Y., assignors to Truck-Lite Company, Inc., a corporation of New York
Filed Feb. 1, 1966, Ser. No. 524,176
14 Claims. (Cl. 339—74)

ABSTRACT OF THE DISCLOSURE

A juncture box for electrical conductors having chambers sealed by the insulative sheathings of the conductors inserted through inwardly tapering bores. A non-conductive grease fills the chambers to embed the bared leads of the conductors clamped between the gripping portions of connectors in the chambers. Push button plungers are depressed to permit quick reception or release of the conductor leads between the gripping portions of the connectors.

This invention relates to an electrical juncture box and more particularly to an electrical juncture assembly through which electrical conductors are interconnected for distribution of electrical energy.

A primary object of the present invention therefore is to provide an electrical juncture box through which electrical connections are made between conductors in a rapid and simple manner and wherein the electrical connections are fully protected against corrosion and the adverse effects of weather.

A further object of the present invention in accordance with the foregoing object is to provide an electrical juncture box provided with one or a plurality of grease filled chambers into which electrical conductors are guidingly inserted for interconnection by an electrically conductive clamping strip to which the conductors are anchored. The grease not only prevents collection of water with the juncture box to protect the conductor leads from corrosion but also dampens vibration and reduces the adverse effect thereof on the electrical connections.

An additional object of the present invention is to provide a protective juncture box for electrical conductors having push-button plungers and cooperating connectors through which rapid electrical connections are established between conductors inserted into the chamber.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a longitudinal sectional view taken substantially through a plane indicated by section line 2—2 in FIGURE 1.

FIGURE 3 is a sectional view taken substantially through a plane indicated by section line 3—3 in FIGURE 2.

FIGURE 7 is a perspective view of one of the conductive anchoring clamps associated with the juncture box.

Figure 1:
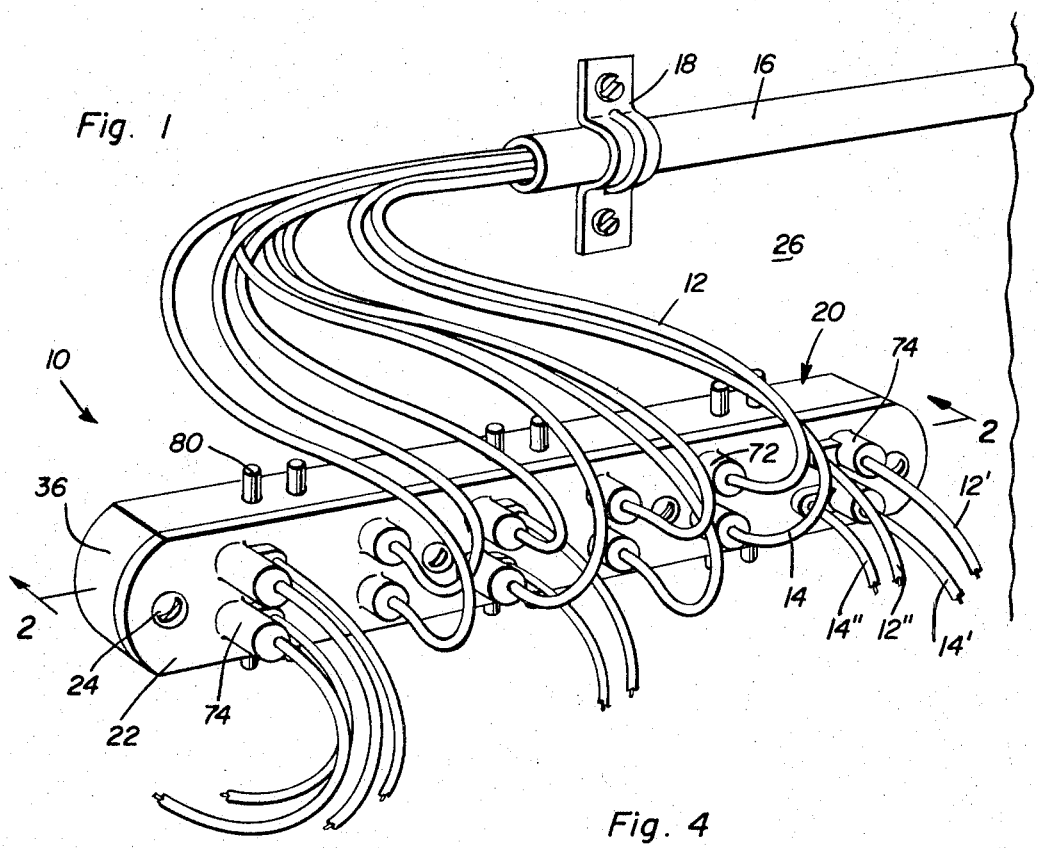
FIGURE 1 is a perspective view showing a typical installation for the juncture box of the present invention.

Referring now to the drawings in detail, FIGURE 1 shows the juncture box generally denoted by reference numeral 10 to which a plurality of electrical input lines are connected including for example the input lines 12 and 14 and from which a plurality of electrical output lines extend including for example the output lines 12', 14', 12" and 14". The juncture box may therefore be mounted at a suitable location for receiving the input lines adjacent to the protective sheathing 16 for example from which the input lines extend, the protective sheathing being held in place by the mounting clamp 18.

It will be observed, that the juncture box includes an enclosure formed by a housing body 20 and a closure lid 22 secured to the housing body by a plurality of longitudinally spaced fasteners 24. The enclosure may therefore be mounted on the vertical wall surface 26 by means of the fastener assemblies 24. As shown in FIGURES 2, 3, 4 and 6, the housing body 20 is made of a relatively rigid, electrically non-conductive material within which a plurality of cavities 28 are formed on either side of partition walls 30 that extend longitudinally between the side walls 32 of the housing body. Thus, each cavity 28 is formed between one of the side walls 32 of the housing body and a partition wall 30 and extends longitudinally between arcuate end wall portions 34. The housing body is also formed with longitudinally spaced bores 36 adjacent to the end portions 38 of the housing body and between the cavities in order to receive the fastener assemblies 24 therethrough. The cavities 28 also extend into the body to a depth determined by the thickness of the bottom wall 40 which interconnects the side walls 32 and partition walls 30 as more clearly seen in FIGURES 3 and 6.

Figure 4:
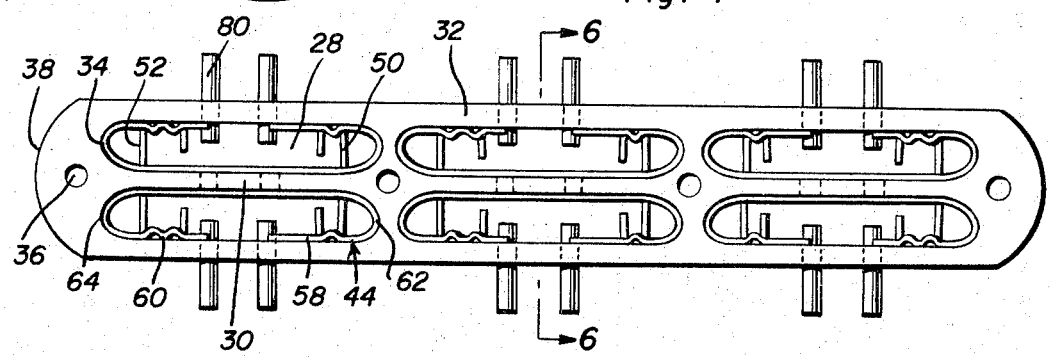
FIGURE 4 is a top plan view of the juncture box with the closure lid removed.
Figure 5:
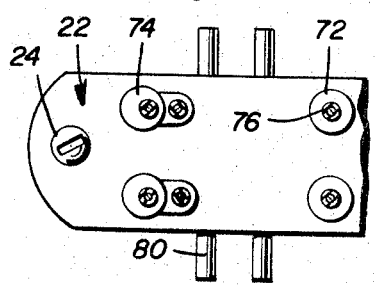
FIGURE 5 is a top plan view of a portion of the juncture box with the closure lid secured thereto.
Figure 6:
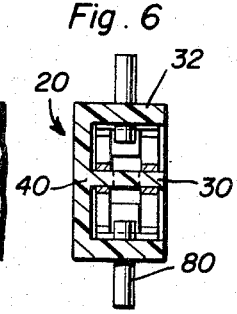
FIGURE 6 is a transverse sectional view taken substantially through a plane indicated by section line 6—6 in FIGURE 4.

Each of the cavities 28 is similar in construction and arrangement and forms a semi-airtight chamber filled with a non-conductive grease 42 as shown in FIGURES 2 and 3 before the closure lid 22 is secured to the housing body. Mounted within each of the cavities 28 and peripherally lining the walls thereof, is an electrically conductive connector member generally referred to by reference numeral 44. As more clearly seen in FIGURE 7, each connector member is made from a conductive strip of elastically flexible material such as copper bent to line the walls of the cavity with the opposite ends 46 thereof being longitudinally spaced from each other along the surface of the side wall 32 defining the cavity within which the connector is inserted. It will also be apparent, that the width of the connector strip 44 is substantially equal to the depth of the cavity 28 within which it is received so as to be completely embedded within the non-conductive grease 42 aforementioned. The connector strip includes a relatively flat portion which lies against the partition wall 30 and from which a pair of longitudinally spaced, U-shaped anchoring sections 50 and 52 are struck out. As shown in FIGURES 2 and 4, the anchoring portions 50 and 52 extend transversely across the cavities or compartments 28 from the flat portion 48 of the connector strip into abutment with the side walls 32. Accordingly, the connector strip is provided with openings 54 and 56 through which the anchoring sections 50 and 52 extend so that they may abut the side wall 32 without interfering with the elastic deflection of the clamping portions 58 and 60 associated with each connector strip. The clamping portions 58 and 60 therefore also lie against the side wall 32 and are connected by the arcuate end portions 62 and 64 to the flat portion 48 of the connector which conform to the arcuate end wall portions 34 of the cavities. The clamping portion 58 is provided with a single rib 66 extending across the width of the conductive strip while the clamping portion 60 includes a pair of parallel ribs 68 extending across the strip. The ribs 66 and 68 project inwardly from the side wall and are respectively aligned with the anchoring portions 50 and 52 so as to form a gap within the anchoring portions when the ends 46 of the conductive strip are inwardly displaced from the side wall 32. The gaps so formed between the anchoring and clamping portions will accommodate the reception of the bared electrical leads 70 associated with the electrical conductors interconnected by the connector strip such as the input line 12 and the output lines 12' and 12" electrically connected thereto and received within the same grease-filled chamber.

It will therefore be noted, that the closure lid 22 is provided with a plurality of outwardly extending projections including an input projection 72 and an output projection 74. Formed within each of the projections, are inwardly converging bores 76 through which the leads 70 are inserted, the bores 76 being arranged to engage the sheathing of the electrical lines so as to seal the grease-filled chamber into which the conductors are inserted. Further, it will be noted that the bores 76 are aligned with the ribs 66 and 68 associated with the clamping portions of the connector strips so that the leads 70 may be inserted into the gap formed between the anchoring and clamping portions when the clamping portions are elastically deflected as hereinbefore indicated.

In order to deflect the clamping portions, each end 46 of a connector strip is received within a notch 78 formed adjacent to an inner end of a push-button plunger 80. Accordingly, the side walls 32 of the housing body slidably mount a pair of push-button plungers 80 for each cavity 28, the plungers extending from the side walls perpendicular to the conductor receiving projections 72 and 74 mounted by the closure lid 22.

From the foregoing description, the construction, assembly and use of the electrical juncture box of the present invention will be apparent. It will therefore be appreciated that each of the connector strips 44 will be firmly held in an associated cavity 28, peripherally lining the walls thereof; by means of the anchoring portions 50 and 52 which extend transversely between the side walls 32 and the partition wall 30. The ends 46 of the connector strips will outwardly bias the push-button plungers 80 so as to firmly anchor the leads 70 between their anchoring portions and the ribs 66 and 68 of the clamping portions in order to establish an electrical connection between the conductor leads 70 bridging the openings 54 and 56 in the connector strips. The push-button plungers 80 are therefore depressed before inserting a conductor through an associated bore 76 in one of the projections 72 or 74 and released after the wire is inserted. Each of the plungers 80 also extends from the side wall 32 of the housing body adjacent to an associated projection 72 or 74. The electrical connection so established within each cavity 28, may therefore be effected in a rapid and simple manner resulting in an electrical connection which is protected against corrosion and the adverse effects of weather because of the non-conductive grease 42 sealed within the cavity. The electrical connection may also be readily replaced by depressing an appropriate plunger 80 in order to release the conductor associated therewith.

The foregoing is considered as illustrative only of the principles of the invention. Further, since numerous modifications and changes will readily occur to those skilled in the art, it is not desired to limit the invention to the exact construction and operation shown and described, and accordingly all sutiable modifications and equivalents may be resorted to, falling within the scope of the invention as claimed.

What is claimed as new is as follows:

1. A juncture box for electrical conductors comprising, an enclosure made of a relatively rigid, non-conductive material having at least one chamber therein, at least two plungers slidably mounted by the enclosure projecting into said chamber, an electrical connector peripherally lining said chamber internally of the enclosure and having anchoring portions and elastically flexible clamping portions, means operatively connecting the plungers to the clamping portions of the connector for displacement thereof transversely of the anchoring portions and, conductor receiving means mounted by the enclosure having apertures aligned with gaps formed between the anchoring portions and the clamping portions in response to said displacement of the clamping portions by the plungers.

2. The combination of claim 1 wherein said chamber is elongated in one direction forming parallel spaced side walls interconnected by arcuate end walls, said connector comprising an elongated strip lining said walls of the chamber and having spaced ends intermediate the arcuate end walls, said clamping portions including ribs formed in the strip adjacent to said ends projecting inwardly from one of said side walls, said plungers being engageable with said ends of the strip.

3. The combination of claim 2 wherein said anchoring portions include longitudinally spaced sections of the strip extending transversely between said side walls of the chamber, said clamping portions having openings through which the sections extend into abutment with said one of the side walls of the chamber spaced between the arcuate end walls and the ends of the strip.

4. The combination of claim 3 wherein said conductor receiving means include projections extending outwardly from the enclosure at right angles to the plungers, said apertures being formed by inwardly converging bores in the projections.

5. The combination of claim 4 wherein said enclosure includes a housing body within which said chamber is formed, and a closure member secured to the body and mounting said conductor receiving means for sealing the chamber.

6. The combination of claim 5 wherein said housing body is provided with an elongated partition and a plurality of said chambers formed on either side of said partition.

7. The combination of claim 1 wherein said chamber is elongated in one direction forming parallel spaced side walls interconnected by arcuate end walls, said connector comprising an elongated strip lining said walls of the chamber, said anchoring portions including longitudinally spaced sections of the strip extending transversely between said side walls of the chamber, said clamping portions having openings through which the sections extend into abutment with one of the side walls from which the clamping portions are displaceable.

8. The combination of claim 1 wherein said conductor receiving means include projections extending outwardly from the enclosure at right angles to the plungers, said apertures being formed by inwardly converging bores in the projections.

9. The combination of claim 1 wherein said enclosure includes a housing body within which said chamber is formed, and a closure member secured to the body and mounting said conductor receiving means for sealing the chamber.

10. The combination of claim 9 wherein said housing body is provided with an elongated partition and a plurality of said chambers formed on either side of said partition.

11. A juncture box for electrical conductors having insulating sheathings comprising, an enclosure made of a relatively rigid, non-conductive material having at least one chamber therein, an elastically deformable, one-piece connector mounted within the chamber and formed to electrically interconnect and engage two such conductors when inserted into the chamber, a non-conductive grease filling said chamber, guide means mounted by the enclosure and engageable with said sheathings of the conductor for guiding insertion of the conductors into engagement with the connector and sealing the grease filled chamber, and means movably mounted by the enclosure for elastically deforming the connector means to receive the conductors when inserted into the chamber.

12. The combination of claim 11 wherein said guide means includes projections mounted on the enclosure having tapered bores therein communicating with said chamber to admit bared lead portions of the conductors and wedgingly block insertion of the sheathings, said connector having grip portions elastically deformed by said movable means and aligned with said bores to engage the lead portions of the conductors.

13. The combination of claim 1 including a non-conductive grease filling said chamber.

14. The combination of claim 13 wherein said conductors have insulating sheathings blocking the apertures of the conductor receiving means to seal the grease within the chamber when the conductors are inserted therein.

References Cited

UNITED STATES PATENTS

| | | | |
|---|---|---|---|
| 1,024,248 | 4/1912 | Capper et al. | 339—260 |
| 2,439,176 | 4/1948 | Mallard | 339—249 |
| 2,489,013 | 11/1949 | Dasher | 339—249 |
| 2,740,099 | 3/1956 | Schultz | 339—118 |
| 2,932,685 | 4/1960 | Raila et al. | 339—115 X |
| 2,997,681 | 8/1961 | Klassen | 339—74 |
| 3,064,229 | 11/1962 | Dee et al. | 339—118 |
| 3,253,247 | 5/1966 | Vos | 339—249 X |

MARVIN A. CHAMPION, *Primary Examiner.*

RICHARD E. MOORE, *Examiner.*